Patented Aug. 9, 1960

2,948,696

PROCESS FOR PREPARING HEAT SEALABLE FILMS, COMPOSITIONS USEFUL THEREIN AND THE ARTICLES PRODUCED THEREBY

William R. R. Park, Midland, Mich., assignor to The Dow Chemical Company, Midland, Mich., a corporation of Delaware No Drawing. Filed Aug. 1, 1958, Ser. No. 752,401

12 Claims. (Cl. 260—28.5)

This invention relates to a process for imparting heat sealing properties to films which are normally incapable of being heat sealed with conventional apparatus. The invention further contemplates a novel coating composition useful in said process and coated articles prepared by said process.

One of the problems facing the flexible film converter is the attainment of proper closures and seams for packages which he manufactures. Such closures and seams may be made with pressure sensitive adhesives or with mechanical closures, such as staples. Both of those methods require multi-step manipulations and are usually inadequate when an impervious seal is desired. With many materials which are thermoplastic, the closures and seams may be formed by drawing the edges of the bag or pouch between two heated shoes to provide a continuous, impervious heat seal. Such a heat sealing technique is well adapted and has been universally accepted for use with high speed packaging operations and is inexpensive in operation. The seals are continuous and as impermeable as the material from which the packaging material is made. However, many materials, such as oriented polystyrene film and the films of like styrene polymers, although thermoplastic, cannot be self-sealed in such manner. When polystyrene film is attempted to be sealed thermally with the conventional heated-bar sealers, the result is either that no seal is formed, or an unattractive and unsatisfactory mass of molten polymer, or a shirred discontinuous seal due to shrinkage caused by loss of the orientation of the film.

Oriented styrene polymeric and the like film materials are valuable, flexible packaging films. The extent of their use would be even more widespread if a satisfactory process for heat sealing were available.

The previous coating means for imparting heat sealability to such materials required the use of a primer to achieve adequate adhesion. The heat sealable coating was then applied over this primer. Such processes and techniques require the inventory of two separate coating compositions and the use of two separate manipulative steps with two independent apparatuses. Thus these two-step processes were time consuming and expensive in operation and capital investment.

It is accordingly the principal object of this invention to provide a process for imparting heat sealing properties to those flexible films of styrene polymers which films of themselves are incapable of being conveniently heat sealed using conventional apparatus.

It is a further object to provide such a process which involves but a single coating step.

A still further object is the provision of a novel coating composition finding use in said process.

Another object is the provision of such a composition based on the aqueous dispersion of polymeric materials.

Still another object is the provision of a coated article which is capable of heat sealability.

The above and related objects are accomplished by the process consisting of applying to the styrene polymer article a continuous coating of a film forming aqueous dispersion consisting essentially of (1) a first aqueous latex of a styrene-butadiene copolymer; (2) a second aqueous latex of a styrene-butadiene copolymer composed of a higher polymerized amount of styrene than said first latex; (3) an aqueous latex of a terpolymer of vinylidene chloride, vinyl chloride and an alkyl acrylate; (4) an aqueous wax dispersion, and (5) a slip agent followed by drying the so-applied coating to a continuous adherent film. The invention further contemplates the coating employed in the process and also the article coated therewith.

The films which are contemplated as subject materials for use in the process of this invention are those flexible films and foils as well as semi-rigid and rigid articles prepared from polystyrene and other alkenyl aromatic polymers containing at least 50 percent by weight of a monoalkenyl aromatic monomer having from 6 to 10 carbon atoms in the aryl nucleus and of the general structure:

$$CH_2=CR-Ar$$

wherein R is methyl or hydrogen and Ar is the aryl nucleus. By such monoalkenyl aromatic polymers and copolymers it is intended to include the resinous thermoplastic materials resulting from the polymerization of monovinyl aromatic monomers, such as para-methyl styrene, alpha-methyl styrene, meta-ethyl styrene, ortho-para-dimethyl styrene, ortho-para-diethyl styrene, para-chlorostyrene, isopropyl styrene, ortho-methyl-para-isopropyl styrene, and ortho-para-dichloro-styrene, and also those materials resulting from the copolymerization of styrene with alpha-methyl styrene or with one or more of any of the above named compounds. Thermoplastic copolymerizates of styrene or of the other aforementioned compounds with other monoethylenically unsaturated monomers, such as acrylonitrile, may also be used. The term "monoalkenyl aromatic polymer" as used herein is intended to include the thermoplastic polymers and copolymers of monoalkenyl aromatic compounds having the alkenyl radical directly attached to a carbon atom of an aromatic nucleus which compounds may also contain one or more alkyl or halogen atoms as nuclear substituents just described.

Flexible films may be prepared from the above described thermoplastic materials by thermal fabrication, specifically thermal extrusion. Processes, techniques, and apparatuses for such fabrication are known. Other techniques include the solvent casting or dipping of the compositions from a volatile solvent followed by evaporation of that solvent. As prepared such films must be oriented for flexibility. Unoriented films are so brittle and weak in other properties as to have no commercial utility in packaging or similar uses. Flexible films of these polymerizates of monoalkenyl aromatic monomers may be prepared in a variety of gauges, thicknesses, colors, and widths. Since the modifications contemplated by this invention involve primarily surface phenomena, they are adaptable to any size, shape or thickness where uniform coatings may be applied. The modifications are useful with moldings, extrusions, or any other thick section of a rigid or semi-rigid nature. With such articles of thick section the need for heat sealability is rather remote. Consequently, the attainment of that property alone may not be justification for treatment. However, the process results in other advantages as will be described. Thus, it is not intended to limit the process or the resulting articles to any particular size or shape, although heat sealable flexible films are the preferred end products.

The coating composition useful in this invention consists of two different styrene-butadiene latexes and a vinylidene chloride terpolymer in combination with a wax dispersion and a slip agent. The first styrene-butadiene latex is composed of about 60 percent styrene component and 40 percent butadiene component. The second latex is composed of about 80 percent styrene and 20 percent butadiene. The term "styrene-butadiene latex" has been employed above for ease of description. It is intended that by the use of such term there should be included the film-forming latexes generally of a copolymer of any monoalkenyl aromatic monomer as defined supra for the operable substrata and a conjugated diolefin such as butadiene and the lower alkyl substituted butadienes. The copolymer compositional limitations, however, should fall generally within the ratios as defined above.

Such latexes are rather generally available. If other latex is desired, it may be easily prepared by emulsion polymerization techniques. As is well known in the art many considerations besides copolymer composition enter into the film formability of any latex. Exemplary of these considerations are particle size distribution and polymeric solids content. It is usually true that for more facile film formation a latex should have a particle size distribution of about 2,000 Angstrom units or less. Additionally the latex should usually contain a minimum of at least about 20 percent by weight of polymeric solids to be film forming. Methods and techniques for obtaining such requisite characteristics are known.

The third film forming component of the coating composition is a latex of a ternary polymer of vinylidene chloride, vinyl chloride and an alkyl acrylate. It is preferred to employ those containing at least about 70 percent by weight of vinylidene chloride with the remainder made up predominantly of vinyl chloride. Terpolymers of the preferred composition exhibit properties such as low moisture vapor transmission, toughness, clarity, elongation and the like that are most valuable for use with films that are to find their way into packaging applications. The acrylate is used in this compound to internally plasticize or to soften the polymeric material to enhance the film formability of the latex and to improve the adherent qualities of the coating composition. This will usually be achieved when the terpolymer is composed of about 10 percent by weight or less of the acrylate. The efficiency of any acrylate in such function is determined principally by the length and chain structure of the alkyl ester group. It is usually true that the greater the bulk of the ester, the greater will be the plasticization tendency of that ester when employed in the blend of this invention. The optimum concentration of copolymerizing acrylates may be easily determined by simple preliminary experiment. An example of a particularly useful latex is one prepared by the emulsion polymerization of 75 percent vinylidene chloride, 20 percent vinyl chloride and 5 percent ethyl acrylate.

As with the styrene-butadiene latexes described above these latexes of the terpolymer will be commercially available. If desired, they may be prepared by the emulsion polymerization of the appropriate monomers.

In addition to the polymeric components the composition also contains a small amount of not more than about 4 percent of the weight of latex solids of a wax. Waxes suitable for the compositions are those having a melting point of at least 60° C. and preferably those that melt between about 60° and 100° C. Those with lower melting points cause the coated films to block. Typical representatives of such waxes are those of the following groups: (a) the true waxes, i.e., the esters of high molecular weight monohydric alcohols and higher fatty acids, examples of which are spermacetic, carnauba, montan, beeswax, Japanese wax, Chinese insect wax, etc.; (b) synthetic esters of polyhydric alcohols with the higher fatty acids, e.g., 1,2-hydroxy stearin, glycol stearate, diethylene glycol laurate etc.; (c) high melting fats, such as tallow (ordinarily used in conjunction with one of the other types); (d) synthetic esters of monohydric alcohols with the higher fatty acids, e.g., phenoxy ethyl stearate, lauryloxyethyl laurate, palmitic and stearic esters of the alcohols obtained by reducing palm of sperm oil fatty acids; (e) monohydric alcohols from the hydrogenation of natural oil fatty acids, and (f) monohydric alcohols from the saponification of waxes such as myricyl alcohol, cetyl alcohol and ceryl alcohol. The preferred wax is carnauba wax.

The block temperature mentioned above is the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 140° F. when placed under an applied pressure of 1 pound per square inch for 24 hours.

The fifth component of the composition is a slip agent. These slip agents are selected from those materials known to be solid lubricants for fabricated polymeric articles. Typical of such materials are the metallic salts of long chain fatty acids such as zinc and lead stearate. Also included as slip agents are talc, mica and calcium carbonate.

The proportions of the general components make up the composition including about 25 parts of the first styrene-butadiene latex; from 15 to 40 parts and preferably from 20 to 30 parts of the second styrene-butadiene latex; from 30 to 60 parts and preferably from 45 to 55 parts of the terpolymer latex; from 2 to 10 parts and preferably from 3 to 5 parts of the wax ingredient and from 0.3 to 3 and preferably from 1 to 2 parts of the slip agent. Any substantial departure from the above proportions will have such adverse effect on one or more of the properties such as adhesion, heat sealability, clarity or others as to preclude the use of the composition in the herein claimed process and application.

The compositions are easily prepared by known mixing methods and techniques. The order of addition of the ingredients is not critical, although for practical considerations, it has been found most convenient to blend the three latex ingredients and to add the wax and slip agent thereto. The wax is conveniently introduced into the composition, by way of aqueous dispersion. Thus a melt may be prepared from 40 parts of wax, 8 parts oleic acid and 5 parts of morpholine at 95° C. with the addition of boiling water added slowly with stirring until the mixture becomes mobile. The dispersion is then cooled and diluted with water to about 15 percent of known volatile solids. This dispersion can then be added directly to the latex and homogeneous distribution obtained. In any coating composition, uniform distribution is mandatory. In similar manner the slip agent may be dispersed in water and this added to the composition.

The coating of this process may be applied by known coating techniques including brushing, roller coating, dipping, spraying or other means. To maintain uniform reproducible properties and characteristics it is essential that each coating be of substantially uniform thickness. Thus after application or simultaneously therewith but before drying, there may be used known doctoring means such as doctor blades or squeeze rolls. A convenient technique is to allow the excess latex to drain off the coating article. For many applications this provides adequate uniformity of coating thickness. After each coating application the coating is dried and fused into a continuous coherent coating. That drying may occur at room temperature although it is preferred to employ slightly elevated temperatures of 60° to 70° C. which appreciably shorten the drying step. Temperatures which are significantly higher than 70° C. should usually be avoided, since they tend to distort the shape or in some instances to destroy or at least alter the orientation, properties and characteristics of the substratum. To achieve heat sealability and other desirable properties it is only necessary that each of the dried coatings completely cover the surface to be coated. As a practical matter such coatings, will, if conventional coating techniques are followed be of a thickness of at least about 0.00005 inch. Additionally, coatings which are greater than about 0.05 inch are difficult to dry without special apparatus and methods and impart little or no significant improvement in properties over the less thick coatings. Accordingly, it is preferred to have the combined coatings of a thickness of from about 0.0001 to 0.05 inch.

The articles prepared in accordance with this invention have the functional advantages of laminate-like structures. Thus the strength, toughness, flexibility and other like properties of the coated article are determined mainly by the substratum. Other properties such as heat sealability, barrier characteristics and solubility are determined by the coating. Adherence of the coating to the substratum also is inherent in the coating composition. Thus all of the materials must be used in the previously described proportions if the desired results are to be attained. For example, if either of the styrene-butadiene latexes are used solely as the film-forming component of the coating, the resulting article may be heat sealed, if attempted immediately after coating application. However, it has been found that such coatings, although initially capable of heat sealing will lose this capacity upon aging for a relatively short time of about 1 or 2 weeks. In addition the coatings of the 60/40 styrene-butadiene latex will exhibit low blocking temperatures, and will cause difficulties in storage. A polystyrene film coated with a dried, fused coating of the 60/40 styrene-butadiene latexes as described will have a great tendency to adhere to itself when wound on rolls when stacked as sheets. These articles will be very difficult to separate without causing severe impairment of the coating. When the 80/20 styrene-butadiene latex is employed as the sole film-forming constituent the resulting coating will not adhere satisfactorily to the substratum. If the terpolymer is used as the sole polymeric component the resultant coating will have unacceptable adherence to the substratum and will block. This adherence cannot be satisfactorily improved by those treatments such as chlorination, scrubbing and the like which have been averred in the prior art to improve adhesion of coatings.

The articles may be treated in accordance with this invention on either one or all surfaces depending upon the end use for which the article is to be employed. The articles after treatment may have impressions printed or stamped thereon usually without affecting the barrier, heat sealability or other properties. Also coated, flexible films and foils may be used with conventional wrapping and packaging machinery without serious effect on the coating.

The operation of the process and the advantages of the composition and article will be more apparent from the following illustrative example wherein all parts and percentages are by weight unless otherwise indicated.

*Example*

A sample of bi-laterally oriented polystyrene film of a thickness of about 0.001 inch was doctor coated with a composition of the following ingredients: 25 parts of polymeric solids of a latex prepared from 60 percent styrene and 40 percent butadiene; 25 parts of a latex prepared from 80 parts styrene and 20 parts butadiene; 50 parts of the solids of a latex prepared from 75 percent vinylidene chloride, 20 percent vinyl chloride and 5 percent ethyl acrylate; 2 parts of carnauba wax; and 1 part of zinc stearate. The coating was dried until clear. The dried coating thickness was about 0.0001 inch. The film was heat sealed to itself by placing two of the coated surfaces in contact and passing between the electrically heated jaws of a conventional heat sealer. Continuous heat seals could be made at a jaw temperature of 185° F. The adhesion of the seal was tested by making a heat seal in the above manner which was 1 inch wide. One of the free ends of the modified film was clamped and the force required to pull the seal apart was determined. It was found that a force of 200 to 300 grams per inch was necessary to separate the so-formed heat seal. The adhesion of the coatings to the substratum was checked by drying to separate the coating from the substratum using pressure sensitive tapes. No separation could be achieved in this manner. After several weeks storage the coated film was still heat sealable and retained its other desirable properties.

By way of contrast when the film was coated with only the 60/40 styrene-butadiene latex described above, the resultant film, when rolled, exhibited severe adhesion and blocking and could not be easily unwound. Also after about 2 weeks this coated film was no longer heat sealable. When the film was coated with only the 80/20 styrene-butadiene latex, the coating was easily stripped from the substratum with pressure sensitive tapes. In further contrast when the film was coated with only the above described terploymer the adherence and blocking characteristics of the coating was unsatisfactory. When the film was coated with a blend of this terpolymer and the 60/40 styrene-butadiene latex, the resultant coating adhered satisfactorily and could be heat sealed but showed such great tendencies to block as to preclude its acceptance as a commercial coating. When the terpolymer was mixed with the 80/20 styrene-butadiene latex the resultant coating did not adhere satisfactorily to the polystyrene film.

When the wax dispersion was omitted from the composition the resultant films exhibited a tendency to block even when employed within the described proportions.

What is claimed is:

1. A process for imparting heat sealability to thermoplastic articles fabricated from the polymerizates of monoalkenyl aromatic monomers consisting of applying to at least one surface of said thermoplastic article a continuous uniform coating of a film forming composition consisting essentially of (1) about 25 parts of an aqueous latex composed of 60 percent styrene and 40 percent butadiene; (2) from 15 to 40 parts of an aqueous latex of a polymer composed of about 80 percent styrene and 20 percent butadiene; (3) from 30 to 60 parts of an aqueous latex of a terpolymer composed of at least 70 percent vinylidene chloride, not more than 10 percent of an alkyl acrylate with the remainder being vinyl chloride; (4) from 2 to 10 parts of a wax having a melting point of from about 60° to 100° C., and (5) from 0.3 to 3 parts of a solid lubricant for said polymerizate followed by drying said continuous coating into a continuous adherent fused coating.

2. The process claimed in claim 1, wherein said article is a flexible, oriented film of polystyrene.

3. The process claimed in claim 1, wherein said terpolymer is composed of 75 percent vinylidene chloride, 20 percent vinyl chloride and 5 percent ethyl acrylate.

4. The process claimed in claim 1, wherein the said drying step is carried out at room temperature.

5. A coating composition useful for coating the polymerizates of monoalkenyl monomers, said composition consisting essentially of (1) about 25 parts of an aqueous latex composed of 60 percent styrene and 40 percent butadiene; (2) from 15 to 40 parts of an aqueous latex of a polymer composed of about 80 percent styrene and 20 percent butadiene; (3) from 30 to 60 parts of an aqueous latex of a terpolymer composed of at least 70 percent vinylidene chloride, not more than 10 percent of an alkyl acrylate with the remainder being vinyl chloride; (4) from 2 to 10 parts of a wax having a melting point of from about 60° to 100° C.; and (5)

from 0.3 to 3 parts of a solid lubricant for said polymerizate.

6. The composition claimed in claim 5 wherein said terpolymer is composed of 75 percent vinylidene chloride, 20 percent vinyl chloride and 5 percent ethyl acrylate.

7. The composition claimed in claim 5, wherein said wax is carnauba wax.

8. The composition claimed in claim 5, wherein said slip agent is zinc stearate.

9. A heat sealable article based on a substratum which has been fabricated of a monoalkenyl aromatic polymer, said article consisting of a dried continuous coating in continuous adherent relationship of such substratum; said dried continuous coating consisting essentially of a blend of (1) a copolymer of 60 percent styrene and 40 percent butadiene; (2) a copolymer of 80 percent styrene and 20 percent butadiene; (3) a terpolymer of at least 70 percent vinylidene chloride, not more than 10 percent of an alkyl acrylate with the remainder being vinyl chloride; (4) a wax having a melting point of from about 60° to 100° C. and (5) a solid lubricant for said polymerizate.

10. The article claimed in claim 9, wherein said terpolymer is composed of 75 percent vinylidene chloride, 20 percent vinyl chloride and 5 percent ethyl acrylate.

11. The article claimed in claim 9, wherein said wax is carnauba wax.

12. The article claimed in claim 9, wherein said slip agent is zinc stearate.

References Cited in the file of this patent

UNITED STATES PATENTS

| | | |
|---|---|---|
| 2,376,778 | Kallander | May 22, 1945 |
| 2,824,024 | Chapman | Feb. 18, 1958 |

FOREIGN PATENTS

| | | |
|---|---|---|
| 599,937 | Great Britain | Mar. 24, 1948 |